(12) United States Patent
Walsh et al.

(10) Patent No.: US 9,825,910 B2
(45) Date of Patent: Nov. 21, 2017

(54) SYSTEM FOR PROVIDING TEMPORARY INTERNET ACCESS FROM A RESTRICTED LOCAL AREA NETWORK ENVIRONMENT

(75) Inventors: Patrick J. Walsh, Naperville, IL (US); Bryan A. Lauer, Chicago, IL (US); Richard Clay Dunham, Schaumburg, IL (US); Vijay Karthik, Plainfield, IL (US); Jason Cohen, Oak Park, IL (US); Barry Atkinson, Barrington, IL (US)

(73) Assignee: GOGO LLC, Chicago, IL (US)

( * ) Notice: Subject to any disclaimer, the term of this patent is extended or adjusted under 35 U.S.C. 154(b) by 269 days.

(21) Appl. No.: 13/588,903

(22) Filed: Aug. 17, 2012

(65) Prior Publication Data
US 2014/0053243 A1 Feb. 20, 2014

(51) Int. Cl.
*H04L 29/06* (2006.01)
*H04L 29/08* (2006.01)

(52) U.S. Cl.
CPC .......... *H04L 63/0236* (2013.01); *H04L 63/08* (2013.01); *H04L 67/12* (2013.01)

(58) Field of Classification Search
CPC .................................................. H04B 7/18506
USPC ............................................................. 726/4
See application file for complete search history.

(56) References Cited

U.S. PATENT DOCUMENTS

| 6,760,757 B1* | 7/2004 | Lundberg ........... H04B 7/18508 709/217 |
| 7,212,980 B2 | 5/2007 | Nakamura et al. |
| 7,269,668 B2* | 9/2007 | Redford .............. H04L 12/2898 709/227 |
| 7,876,849 B2* | 1/2011 | Gardner ............. H04B 7/18506 375/220 |
| 7,962,416 B1 | 6/2011 | Durbin et al. |
| 2002/0049640 A1* | 4/2002 | Sheriff ............... G06Q 30/0272 705/14.68 |
| 2002/0062374 A1 | 5/2002 | Kikuchi |
| 2005/0027616 A1 | 2/2005 | Jones et al. |

(Continued)

FOREIGN PATENT DOCUMENTS

JP 2002158707 A 5/2002
JP 2003006064 A 1/2003
(Continued)

OTHER PUBLICATIONS

Serverfault (http://serverfault.com/questions/339338/how-to-allow-network-connection-only-from-apple-app-store, Dec. 9, 2011).*
(Continued)

*Primary Examiner* — Harris C Wang
(74) *Attorney, Agent, or Firm* — Marshall, Gerstein & Borun LLP; Randall G. Rueth (57) ABSTRACT

The captive portal environment exists where there is only a single available communication service that is available to the user. An example of a captive portal environment is on board an aircraft in flight, where the passengers have no access to any communication services, other than the aircraft resident wireless Local Area Network. The Restricted LAN Internet Access System functions in the aircraft to grant the user a temporary Internet session so they can download a prerequisite application from the Internet to make use of an application/service resident on the Restricted LAN in the aircraft.

10 Claims, 3 Drawing Sheets

(56) References Cited

U.S. PATENT DOCUMENTS

| | | | |
|---|---|---|---|
| 2005/0037787 A1* | 2/2005 | Bachner | H04L 67/1095 455/502 |
| 2005/0164677 A1 | 7/2005 | Tsutsui | |
| 2005/0286452 A1* | 12/2005 | Hardgrave | H04W 84/005 370/310 |
| 2006/0031407 A1* | 2/2006 | Dispensa | H04L 29/12009 709/219 |
| 2006/0080414 A1* | 4/2006 | Cohen | H04L 41/0879 709/220 |
| 2006/0190410 A1* | 8/2006 | Harper | G06F 21/10 705/59 |
| 2007/0027767 A1 | 2/2007 | Akagane | |
| 2009/0010200 A1* | 1/2009 | Lauer | H04B 7/18506 370/316 |
| 2009/0010220 A1 | 1/2009 | Noma | |
| 2009/0282469 A1* | 11/2009 | Lynch | H04W 12/06 726/11 |
| 2010/0107225 A1* | 4/2010 | Spencer | H04L 63/0876 726/4 |
| 2011/0093918 A1 | 4/2011 | Leconte et al. | |
| 2011/0116373 A1* | 5/2011 | Lauer | H01Q 1/007 370/232 |
| 2012/0164976 A1 | 6/2012 | Ando et al. | |
| 2012/0290436 A1* | 11/2012 | Frost et al. | 705/26.41 |

FOREIGN PATENT DOCUMENTS

| | | |
|---|---|---|
| JP | 2010118840 A | 5/2010 |
| JP | 2010141625 A | 6/2010 |
| JP | 2012134753 A | 7/2012 |
| WO | WO-02/42899 A2 | 5/2002 |
| WO | WO-2008/093900 A1 | 8/2008 |
| WO | WO-2012/099697 A1 | 7/2012 |

OTHER PUBLICATIONS

International Search Report in co-pending PCT Application No. PCT/US13/45071 dated Feb. 21, 2014, 3 pages.

European Search Report, corresponding European Patent Application No. 13829974.8, dated Feb. 12, 2016.

Office Action, Mexican Patent Application No. MX/a/2015/002114, dated Jan. 11, 2017.

Office Action, Japanese Patent Application No. 2015-527492, dated Apr. 11, 2017.

Office Action, Chinese Patent Application No. 201380053397.4, dated Apr. 12, 2017.

* cited by examiner

SYSTEM FOR PROVIDING TEMPORARY INTERNET ACCESS FROM A RESTRICTED LOCAL AREA NETWORK ENVIRONMENT

FIELD OF THE INVENTION

This invention relates to a system which provides temporary Internet access from a Restricted Local Area Network environment such as, for example, temporary access to Internet resident resources from an aircraft, which resources the passengers require to enable In-Flight Entertainment Content to be delivered to them on an aircraft.

BACKGROUND OF THE INVENTION

There are instances in a Restricted Local Area Network environment, such as a captive portal, where it is necessary to access a resource from the Internet in order to activate or use a service that is offered in the Restricted Local Area Network. One example of such a situation is where the user requires a smart-phone application for accessing and logging into the Restricted Local Area Network. Without access to the Internet, the user cannot download the smart-phone application itself. Another example is a video application for viewing In-Flight Entertainment Content, such as movies, onboard an aircraft. Internet access is not needed to view the movie, since the movie resides on an In-Flight Entertainment server resident on the aircraft. However, Internet access is typically necessary for the passenger to be authenticated and to download the application (hosted for example on an Internet-based server) that is used to view the movies on the In-Flight Entertainment server, which is located on the aircraft.

The captive portal environment exists where there is only a single available communication service that is available to the user. Examples of a captive portal environment is on board an aircraft in flight, where the passengers have no access to any communication services, other than the aircraft resident wireless Local Area Network, or a hotel, where the resident wired/wireless Local Area Network serves the hotel rooms. The captive portal typically operates by forcing an HTTP client on a Restricted Local Area Network to access a special Web page (usually for authentication purposes) before using the Internet in the normal manner. A captive portal turns a Web browser into an authentication device. This is done by intercepting all packets, regardless of the source address or port, which are transmitted by the user's communication device until the user opens a browser and tries to access the Internet. At that time, the browser is redirected to a special Web page which may require authentication and/or payment, or may simply display an acceptable network use policy and require the user to agree to the policy before continued Internet access is permitted.

One problem with such a captive portal Internet access process is that once the user is connected to the Internet, the usage of the Local Area Network to browse the Internet is unconstrained. In an environment where Local Area Network bandwidth is limited or the duration of the user's communication session is an issue or the overall magnitude of the data downloading is a factor, some sort of data access policy is required. Limiting the browsing capability of the user to authorized sites is problematic, since the user can open links from inside of the initial Web page or hop to other sites, and an attempt to manage the list of permitted sites represents a dynamically changing data communications management problem. In addition, in cases where the Internet access is temporary, to only retrieve an application for use exclusively in the Restricted Local Area Network, there is no ability in existing systems to ensure that the Internet access is truly temporary or limited to retrieving the selected application for use on the Restricted Local Area Network.

Therefore, there presently is no reliable, effective, cost-efficient way of delivering temporary captive portal Internet access to a selected Web site to only retrieve an application for use exclusively in the Restricted Local Area Network.

BRIEF SUMMARY OF THE INVENTION

The above-described problems are solved and a technical advance achieved in the field by the present System for Providing Temporary Internet Access From a Restricted Local Area Network Environment (termed "Restricted LAN Internet Access System" herein) which functions to grant the user a temporary Internet session so they can download a prerequisite application from a selected Web site to only make use of the application to access a service resident on the Restricted LAN, such as In-Flight Entertainment Content on the aircraft. The term "In-Flight Entertainment Content" includes movies, music, WEB pages, catalogs, magazines, and any other data that the aircraft passengers may wish to view on their wireless personal communication devices while in flight on the aircraft. Another instance of a prerequisite application is any application on Apple's iTunes store. Apple maintains very tight control on their applications and does not allow them to be stored anywhere outside the iTunes store.

The Restricted LAN Internet Access System grants the user a temporary Internet session in a transparent manner. The user does not have to create an account. The temporary session could provide complete access to the Internet or could be limited to certain sites. In addition, the temporary session could be limited by controlling the allowed time or controlling the byte volume or control the throughput (e.g. limit the user to a maximum data rate). The Restricted LAN Internet Access System would also implement several security measures to prevent users from gaming the Restricted LAN Internet Access System to get free service, with these security measures being the use of cookies and the use of device IDs such as MAC address.

DETAILED DESCRIPTION OF THE INVENTION

In a Restricted Local Area Network environment, such as a captive portal, it is often necessary to access a resource from a special Web site on the Internet in order to activate or use a service that is offered in the Restricted Local Area Network. The captive portal environment exists where there is only a single available communication service that is available to the user. An example of a captive portal environment is on board an aircraft in flight, where the passengers have no access to any communication services, other than the aircraft resident wireless Local Area Network. The captive portal typically operates by forcing an HTTP client on a Restricted Local Area Network to access a special Web page (usually for authentication purposes). A captive portal turns a Web browser into an authentication device. This is done by intercepting all packets, regardless of the source address or port, which are transmitted by the user's communication device until the user opens a browser and tries to access the Internet. At that time, the browser is redirected to a Web page which may require authentication and/or payment, or may simply display an acceptable network use policy and require the user to agree to the policy before continued access is permitted. Captive portals are used at many Wi-Fi hotspots, and can be used to control wired access (e.g. apartment houses, hotel rooms, business centers, "open" Ethernet jacks) as well.

Since the login page itself must be presented to the client, either that login page is locally stored in the gateway, or the Web server hosting that page must be "whitelisted" via a walled garden to bypass the authentication process. Depending on the feature set of the gateway, multiple Web servers can be whitelisted (say for iframes or links within the login page). In addition to whitelisting the URLs of Web hosts, some gateways can whitelist TCP ports. The MAC address of attached clients can also be set to bypass the login process. A problem with this whitelist process is maintaining a current list of Web servers and links.

The solution implemented by the Restricted LAN Internet Access System 101 is to grant the user a temporary Internet session so they can download the prerequisite application from a selected Web site. The Restricted LAN Internet Access System 101 grants the user a temporary session in a transparent manner so the user does not have to create an account etc. The temporary session could provide complete access to the Internet or could be limited to certain sites. In addition, the temporary session could be limited by controlling the allowed time or controlling the byte volume or control the throughput (e.g. limit the user to a maximum data rate) to prevent the temporary link from being used to thwart its stated purpose, which is to access a predetermined application which is resident on the special Web site.

Restricted Local Area Network

Figure 1:
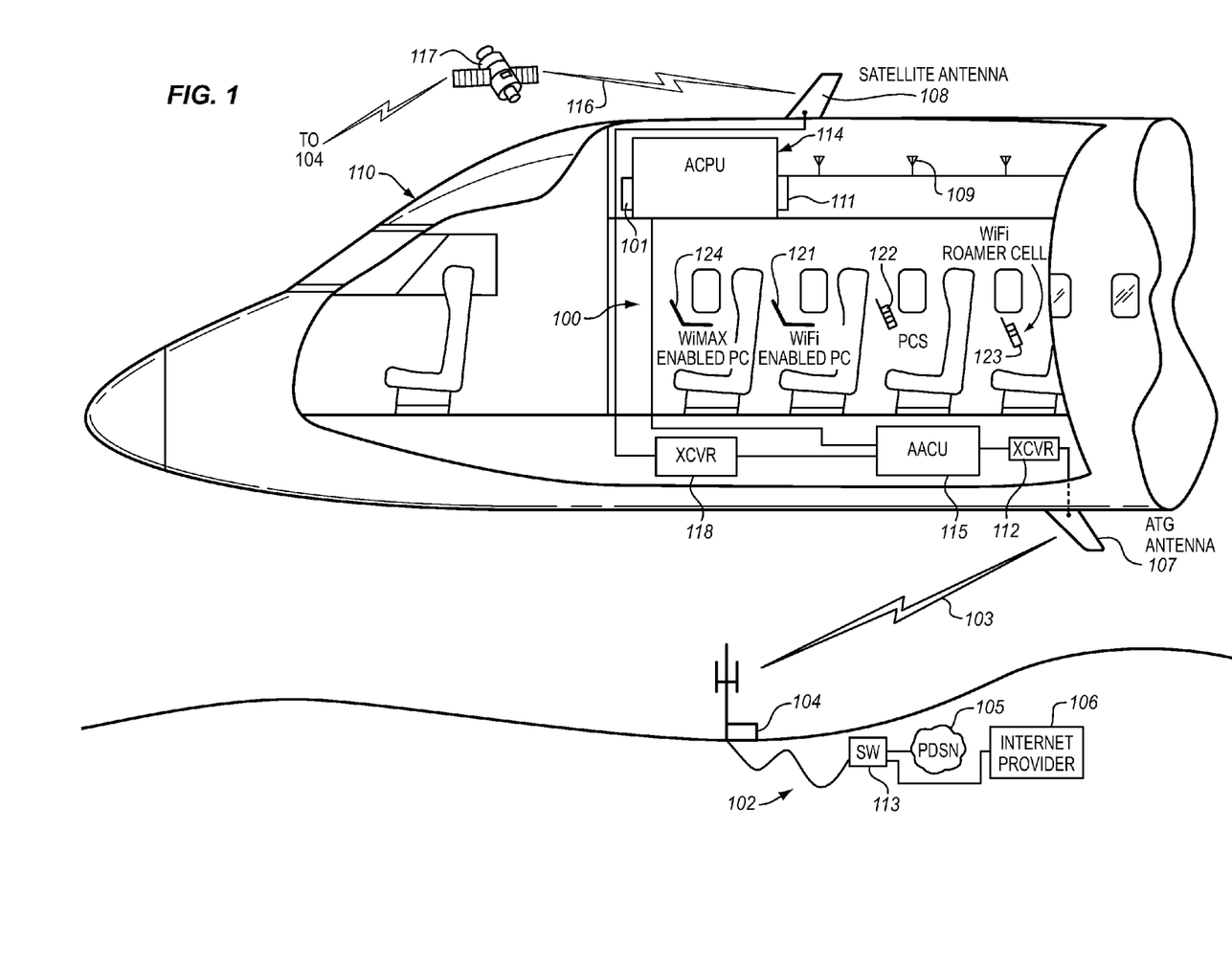
FIG. 1 illustrates the Restricted LAN Internet Access System installed in a typical operating environment.
Figure 2:
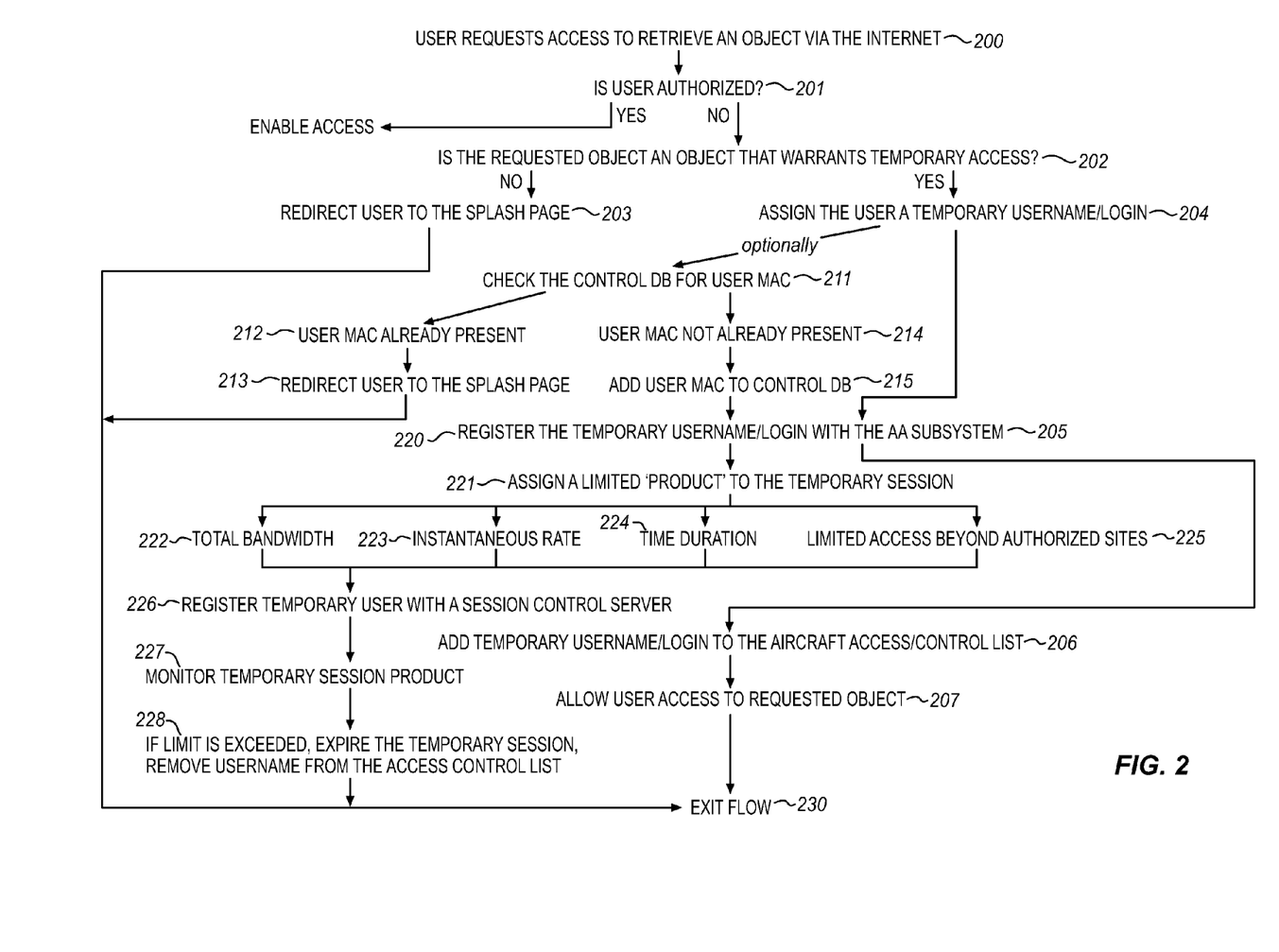
FIG. 2 illustrates, in flow diagram form, the operation of the Restricted LAN Internet Access System.
Figure 3:
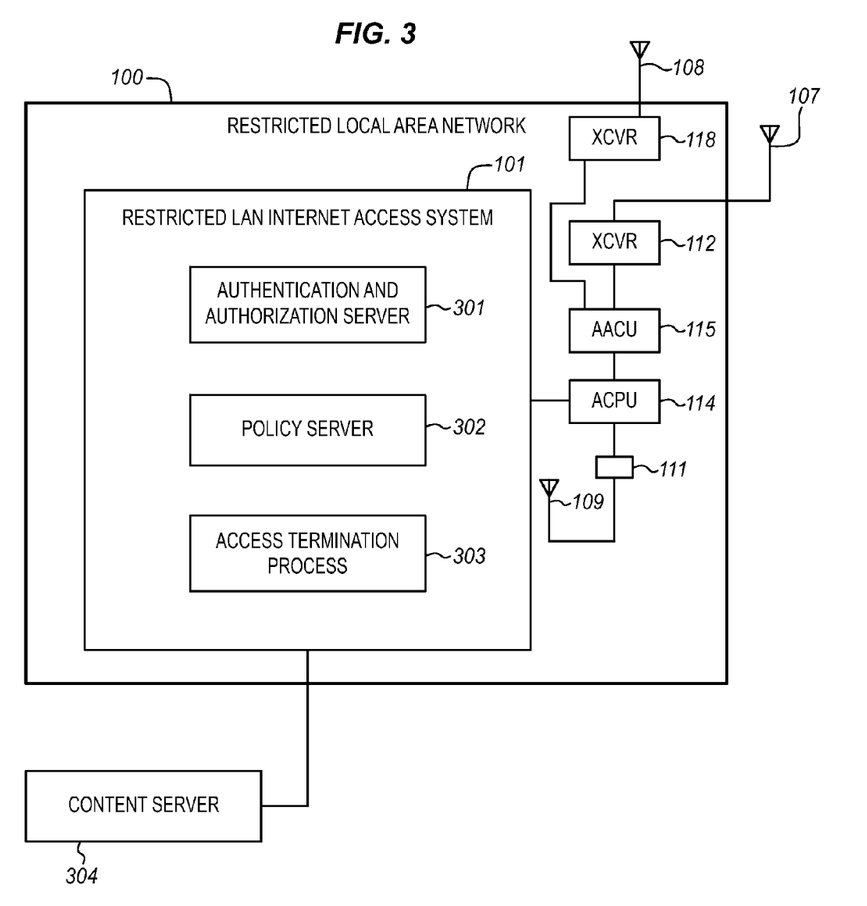
FIG. 3 illustrates, in block diagram form, details of a typical implementation of the Restricted LAN Internet Access System.

FIG. 1 illustrates the Restricted LAN Internet Access System 101 installed in a typical operating environment, FIG. 2 illustrates in flow diagram form the operation of the Restricted LAN Internet Access System 101, and FIG. 3 illustrates, in block diagram form, details of a typical implementation of the Restricted LAN Internet Access System 101. FIG. 1 illustrates a typical Restricted Local Area Network 100 in which the Restricted LAN Internet Access System 101 is operational. This environment, as an example of such a network, is embodied in an aircraft 110, which provides various communication services to the passengers' communication devices 121-124 while the aircraft 110 is in flight. This example is not intended to limit the scope of the concepts described and claimed herein, but is used simply to illustrate these concepts.

The Restricted Local Area Network 100 resident on the aircraft 110 communicates with a Ground Subsystem 102 which connects the communication traffic of the Air-To-Ground Link(s) 103 (and/or Satellite Link(s) 116 through satellite(s) 117) with traditional cellular-type communication network elements, including a Base Station 104. Base Station 104 interconnects the voice traffic (if provisioned) through switch 113 to the Public Switched Telephone Network 105, and data communications to the Internet 106 via Packet Data Switching Node (PDSN) 105. Thus, the communications between the passenger communication devices 121-124 located in an aircraft 110 and the Ground Subsystem 102 of the ground-based communication network are transported via the Air-To-Ground Link(s) 103 and/or Satellite Link(s) 116 and satellite(s) 117.

This Restricted Local Area Network 100 comprises a plurality of elements used to implement a communication backbone that enables, for example, wireless communication for a plurality of wireless communication devices 121-124 which can be of diverse nature. The aircraft-based Restricted Local Area Network 100 implements an in-cabin radio frequency communication system that has a short range of operation. This Restricted Local Area Network 100 can support both circuit-switched and packet-switched connections from passenger wireless communications devices 121-124 and interconnects the communications of these passenger wireless communications devices 121-124 with the Ground Subsystem 102 as noted above. The passenger wireless communications devices 121-124 include a diversity of communication devices, such as laptop computers 121, cellular telephones 122, MP3 music players (not shown), Personal Digital Assistants (PDA) (not shown), WiFi-based devices 123, WiMax-based devices 124, and the like, and for simplicity of description are all collectively termed "passenger wireless communication devices" herein, regardless of their implementation-specific details; and the following description uses the wireless paradigm as one example.

The basic elements of the Restricted Local Area Network 100 comprise at least one antenna 107, 108 or other means of coupling electromagnetic energy 103, 116, respectively, to/from the Restricted Local Area Network 100, located within the aircraft 110 which serves to communicate with the plurality of passenger wireless communications devices 121-124 located within the aircraft 110, with the Base Station 104. The at least one antenna 107, 108 is connected via transceivers 112, 118 to Air-To-Ground Airborne Communications Unit (AACU) 115 (which transceivers can be incorporated into AACU 115) for providing management, switching, routing, and aggregation functions for the communication transmissions of the passenger wireless communications devices.

AACU 115 is connected to Airborne Control Processor Unit (ACPU) 114 which encompasses a plurality of elements that serve to regulate the wireless communications in the aircraft cabin with the plurality of passenger wireless communications devices 121-124. The Airborne Control Processor Unit (ACPU) 114 is connected to a low power radio frequency transceiver 111 located in the aircraft cabin for providing a data-based packet-switched communication space using a wireless communication paradigm, such as WiFi (which could also convey packet-switched Voice over Internet Protocol (VoIP)) via a plurality of antennas 109. In addition, the Airborne Control Processor Unit (ACPU) 114 can optionally be connected to at least one low power radio frequency transceiver 111 for providing a circuit-switched communication space using a wireless communication paradigm.

It is obvious that these above-noted segments of Air-To-Ground Airborne Communications Unit (AACU) 115, Airborne Control Processor Unit (ACPU) 114 and the Restricted LAN Internet Access System 101 can be combined or parsed in various ways to produce an implementation that differs from that disclosed herein. The particular implementation described is selected for the purpose of illustrating the concept of the invention and is not intended to limit the applicability of this concept to other implementations.

Gateway transceivers 112, 118 are used to interconnect the Air-To-Ground Airborne Communications Unit (AACU) 115 to antennas 107, 108 (or these transceivers 112, 118 may be part of AACU 115) to enable signals to be transmitted from the aircraft-based network for passenger wireless communications devices to transceivers located on the ground via direct radio frequency transmissions or satellite transmissions, respectively. Included in these components is a communications router function to forward the communication signals to the proper destinations. Thus, signals that are received from the Ground Subsystem 102 are destined for passengers on the aircraft and are therefore routed to these individuals, while signals routed to destinations located on the ground are routed to the Ground Subsystem 102. Aircraft antenna patterns that typically minimize nadir (Earth directed) effective radiated power (ERP) may be used in the implementation of the antenna(s) 107 on the aircraft to serve the aircraft-based network for passenger wireless communications devices or are directed to a satellite via antenna 108.

Passenger Login for System Access

On each aircraft 110, the passenger access to electronic communications typically is regulated via a passenger wireless communications device registration process, where each electronic device must be identified, authenticated, and authorized to receive service, as described in more detail with respect to FIGS. 2 and 3. Since the aircraft 110 is a self-contained environment with respect to the wireless communications between the passenger wireless communications devices 121-124 and the airborne Restricted Local Area Network 100 extant in the aircraft 110, all communications are regulated by the ACPU 114. Thus, when a passenger activates their passenger wireless communications device 121 to request an application, a communication session is initiated between the passenger wireless communications device 121 and the ACPU 122 to identify the type of device the passenger is using and, thus, its wireless protocol.

In particular, IP address assignment takes place before the splash page process as noted below. The IP address assignment is done via a standard protocol as soon as the Passenger Wireless Communications Device 121 associates with the access point (AP).

The order of initiating the data communications session is:

Passenger Wireless Communications Device 121 associates to AP.

Passenger Wireless Communications Device 121 requests IP address from the ACPU 114 via the DHCP protocol ACPU 114 assigns IP address to the requesting Passenger Wireless Communications Device 121 via the DHCP protocol The Browser in the Passenger Wireless Communications Device 121 requests some web page/object ACPU 114 inspects the request ACPU 114 checks to see if user/device is authenticated If authenticated, ACPU 114 allows the request to go through If not authenticated, ACPU 114 redirects the user to the standard splash page.

A "splash page" is delivered to the passenger on the passenger wireless communications device 121 to announce entry into the wireless network portal. Once this is established, the ACPU 114 transmits a set of login displays to the passenger wireless communications device 121 to enable the passenger to identify themselves and validate their identity (if the passenger wireless communications device is not equipped to automatically perform these tasks via a smart client which automatically logs the passenger into the Restricted Local Area Network 100). As a result of this process, the passenger wireless communications device 121 is provided with a unique electronic identification (IP address), and the Restricted Local Area Network 100 can respond to the passenger wireless communications device 121 without further administrative overhead. The authentication process may include the use of security processes, such as a password, scan of a passenger immutable characteristic (fingerprint, retina scan, etc.), and the like.

Once the passenger wireless communications device 121 is logged in, the passenger can access the free standard electronic services that are available from the network 100 or customized electronic services for the particular passenger. The screens that are presented to the passenger can be customized to present the branding of the airline on which the passenger is traveling. One example of a service is the access to In-Flight Entertainment content, which is stored on a Content Server 304 on the aircraft (or at the Ground Subsystem 102). A Content Server 304, having a content memory for storing content data, is connected to the aircraft based Restricted Local Area Network 100 for exchanging content data with the plurality of passenger wireless communication devices via the aircraft based Restricted Local Area Network 100. Typically, the passenger wireless communication device must register with the service provider and this can be an authentication process executed on the aircraft or preferably on the ground via a temporary Internet connection.

Restricted LAN Internet Access System

FIG. 3 illustrates, in block diagram form, details of a typical implementation of the Restricted LAN Internet Access System 101. The implementation disclosed herein is an example and other variations are well within the abilities of one of ordinary skill in the art. For illustrative purposes, the Restricted LAN Internet Access System 101 is shown as a collection of various functional elements, which elements can either reside on board the aircraft or on the ground, typically in the Ground Subsystem 102. FIG. 3 implies that the physical location of these functional elements is onboard the aircraft, although some or all of these elements may be located on the ground as a design choice.

Restricted LAN Internet Access System 101 includes an Authentication Server 301 (typically located on the ground), which is responsive to a request from one of the plurality of passenger wireless communication devices 121 to establish a temporary communication session with a server (not shown) on the Internet 106, for authenticating the identity of the one passenger wireless communication device 121 and its authorization to receive the requested access to the server on the Internet 106. In addition, a Policy Server 302 functions to enable the one passenger wireless communication device 121 to establish a temporary communication session with the server on the Internet 106 via the radio frequency link 103 and the aircraft based Restricted Local Area Network 100 as a function of at least one usage limitation selected from the class of usage limitations, including: total data bandwidth used, instantaneous bandwidth used, time duration of the communication session, and access of sites beyond a list of authorized sites. Furthermore, an Access Termination Process 303, is responsive to the one passenger wireless communication device 121 exceeding the at least one usage limitation, for terminating the temporary communication session with the server on the Internet 106.

Operation of the Restricted LAN Internet Access System

At step 200, the user requests access to the Restricted Local Area Network 100 to retrieve an object via the Internet. At step 201 the ACPU 114 determines if the user/device is authenticated and is a subscriber to the aircraft-based services. If yes, the request is allowed. If not, processing proceeds to step 202, where the Restricted LAN Internet Access System 101 reviews the user's request and determines whether this request warrants granting the user temporary Internet access. If not, then at step 203, the Restricted LAN Internet Access System 101 redirects the user to the standard "splash page" which present a description of the service denial. The process then exits at step 230.

If at step 202, the Restricted LAN Internet Access System 101 determines that the user's request warrants granting temporary Internet access, then processing advances to step 204 where the user's request is transmitted to equipment located on the ground and the user is assigned a temporary user name/login. Optionally, at step 205, this process entails the access control database of the Restricted LAN Internet Access System 101 can be scanned to determine whether the user's MAC address has already been recorded and if so, the Restricted LAN Internet Access System 101 redirects the user to the standard "splash page" which present a description of the service denial. The process then exits at step 230. If the user's MAC address is not present in the access control database of the Restricted LAN Internet Access System 101, then the user's MAC address is added to the access control database of the Restricted LAN Internet Access System 101.

Processing advances from either step 204 or 205 to step 206 where the user's temporary username/login is registered with the Authentication and Authorization Server 301 of the Restricted LAN Internet Access System 101, where the Authentication and Authorization Server 301 may reside on the aircraft or in a terrestrial location. Processing can advance to step 213 where the temporary username/login is added to the aircraft access control list and processing advances to step 214 where the user is permitted to access the requested object. Once the object is retrieved, at step 230 the temporary Internet access process is terminated and the user is Restricted to access of services and content only within the Restricted LAN 100.

Optionally and preferably, at step 207 the user's temporary Internet session is typically assigned a limited "product" definition, which constrains the user's access to the Internet. These limits include at least one of total bandwidth metrics at step 208, instantaneous data rate metrics at step 209, time duration of the Internet data session at step 210, limitations on Internet access beyond a predetermined list of authorized sites at step 211. The Restricted LAN Internet Access System 101 uses one or more of these processes to monitor the temporary Internet access granted to the user.

At step 212, the Restricted LAN Internet Access System 101 registers this user with a session control server of the Restricted LAN Internet Access System 101, which monitors the user's Internet access using the ones of processes 209-211 enabled for this temporary Internet access product. If the user exceeds any of the limits defined by the selected products, the temporary Internet access session is terminated and processing advances to step 230 and the Internet session is terminated. If the user remains within the limits defined by the selected products, the user can retrieve the selected object and processing exits at step 230, with the termination of the temporary Internet access, once the application retrieval process is completed and the passenger activates the retrieved prerequisite application to make use of an application/service resident on the Restricted LAN.

SUMMARY

The Restricted LAN Internet Access System therefore functions to grant the user a temporary Internet session so they can download a prerequisite application to make use of an application/service resident on the Restricted LAN.

What is claimed as new and desired to be protected by Letters Patent of the United States is:

1. A system for providing passengers' wireless communication devices with temporary Internet access from an aircraft, comprising:
   an aircraft based Local Area Network for establishing bidirectional communications links with a plurality of passenger wireless communication devices that are located in an aircraft, wherein the aircraft based Local Area Network provides the only communication services to the plurality of passenger wireless communication devices;
   a communication link that extends from the aircraft to a terrestrial radio frequency transceiver for the bidirectional exchange of data communications between the plurality of passenger wireless communication devices in the aircraft and the Internet, wherein the communication link is accessible via the terrestrial radio frequency transceiver;
   a Local Area Network Internet Access System configured to enable at least one of the plurality of passenger wireless communication devices to download a prerequisite application from the Internet by establishing a temporary communication session with a server on the Internet via the communication link and the aircraft based Local Area Network, comprising:
      an authentication server, responsive to a request from one of the plurality of passenger wireless communication devices to establish a temporary communication session with the server on the Internet via the communication link, for authenticating an identity of the one of the plurality of passenger wireless communication devices and authorizing the one of the plurality of passenger wireless communication devices to communicate with the server on the Internet via the communication link,
      a policy server for enabling the one of the plurality of passenger wireless communication devices to establish the temporary communication session with the server on the Internet via the communication link and the aircraft based Local Area Network as a function of at least one usage limitation selected from a class of usage limitations, including: total data bandwidth used, instantaneous bandwidth used, time duration of the temporary communication session, and access of sites beyond a list of authorized sites, and
      an access termination process, responsive to the one of the plurality of passenger wireless communication devices completing the download of the prerequisite application, for terminating the temporary communication session with the server on the Internet via the communication link after the download of the prerequisite application is completed;
   a content manager, having a content memory for storing content data, connected to the aircraft based Local Area Network, for exchanging content data with the one of the plurality of passenger wireless communication devices via the aircraft based Local Area Network; and
   an access manager, connected to the content manager and the aircraft based Local Area Network, for enabling the one of the plurality of passenger wireless communication devices to access the content manager in response to a request from the prerequisite application on the one of the plurality of passenger wireless communication devices.

2. A method for providing passengers' wireless communication devices with temporary Internet access from an aircraft, comprising:
    establishing bidirectional communications links, via an aircraft based Local Area Network, with a plurality of passenger wireless communication devices that are located in an aircraft in which the aircraft based Local Area Network provides the only communication services to the plurality of passenger wireless communication devices;
    operating a communication link that extends from the aircraft to a terrestrial radio frequency transceiver for the bidirectional exchange of data communications between passenger wireless communication devices in the aircraft and the Internet, which is accessible via the terrestrial radio frequency transceiver;
    enabling at least one of the plurality of passenger wireless communication devices to download a prerequisite application from the Internet by establishing a temporary communication session with a server on the Internet via the communication link and the aircraft based Local Area Network, comprising:
        authenticating, in response to a request from one of the plurality of passenger wireless communication devices to establish a temporary communication session with a server on the Internet via the communication link, an identity of the one of the plurality of passenger wireless communication devices,
        authorizing the one of the plurality of passenger wireless communication devices to communicate with the server on the Internet via the communication link,
        enabling the one of the plurality of passenger wireless communication devices to establish the temporary communication session with the server on the Internet via the communication link and the aircraft based Local Area Network as a function of at least one usage limitation selected from a class of usage limitations, including: total data bandwidth used, instantaneous bandwidth used, time duration of the temporary communication session, and access of sites beyond a list of authorized sites, and
        terminating, in response to the one of the plurality of passenger wireless communication devices completing the download of the prerequisite application, the temporary communication session with the server on the Internet via the communication link after the download of the prerequisite application is completed;
    exchanging content data from a content manager with the one of the plurality of passenger wireless communication devices via the aircraft based Local Area Network, the content manager having a content memory for storing the content data, and the content manager connected to the aircraft based Local Area Network; and
    enabling the one of the plurality of passenger wireless communication devices to access the content manager in response to a request from the prerequisite application on the one of the plurality of passenger wireless communication devices.

3. A system for providing communication devices with temporary Internet access from a Restricted Local Area Network environment which is operational in a predetermined volumetric region of space, comprising:
    at least one regulating computing device physically disposed in the predetermined volumetric region of space and connected to a radio frequency transceiver, wherein the regulating computing device is configured to establish, via the radio frequency transceiver, bidirectional communications links with a plurality of communication devices extant in a Restricted Local Area Network environment, and wherein the Restricted Local Area Network environment is operational in the predetermined volumetric region of space in which the at least one regulating computing device provides the only communication services to the plurality of communication devices;
    a Restricted LAN Internet Access System physically located in the predetermined volumetric region of space, operating in the Restricted Local Area Network environment, for enabling at least one of the plurality of communication devices to download a prerequisite application by establishing a temporary bidirectional communication link with at least one location that is external to the predetermined volumetric region of space, comprising:
        an authentication server, responsive to a request from the at least one of the plurality of communication devices to establish the temporary bidirectional communication link with the at least one location that is external to the predetermined volumetric region of space, configured to authenticate an identity of the at least one of the plurality of communication devices and authorize the at least one of the plurality of communication devices to communicate via the temporary bidirectional communication link,
        a policy server for enabling the at least one of the plurality of communication devices to establish the temporary bidirectional communication link with the at least one location as a function of at least one usage limitation selected from a class of usage limitations, including: total data bandwidth used, instantaneous bandwidth used, time duration of the temporary bidirectional communication link, and access of sites beyond a list of authorized sites, and
        an access termination process, responsive to the at least one of the plurality of communication devices completing the download of the prerequisite application, for terminating the temporary bidirectional communication link with the at least one location that is external to the predetermined volumetric region of space after the download of the prerequisite application is completed;
    a content manager, having a content memory for storing content data, connected to the Restricted Local Area Network environment, for exchanging content data with the at least one of the plurality of communication devices via the Restricted Local Area Network environment; and
    an access manager, connected to the content manager and the Restricted Local Area Network environment, for enabling the at least one of the plurality of communication devices to access the content manager in response to a request from the prerequisite application on the at least one of the plurality of communication devices.

4. The system for providing communication devices with temporary Internet access from a Restricted Local Area Network environment of claim 3 further comprising: wherein the predetermined volumetric region of space is a cabin of an aircraft, and wherein the at least one regulating computing device is an airborne control processing unit (ACPU) configured to establish wireless bidirectional communications links with the plurality of communication devices in the cabin of the aircraft.

5. The system for providing communication devices with temporary Internet access from a Restricted Local Area Network environment of claim 3 wherein the radio frequency transceiver connected to the at least one regulating computing device is a first radio frequency transceiver, and wherein the Restricted LAN Internet Access System further comprises:
 a second radio frequency transceiver that exchanges data communications between the Restricted Local Area Network environment and a third transceiver connected to the at least one location as part of the temporary bidirectional communication link.

6. The system for providing communication devices with temporary Internet access from a Restricted Local Area Network environment of claim 3 wherein the Restricted LAN Internet Access System further comprises:
 an antenna communicatively coupled to a satellite, wherein the antenna is configured to exchange data communications between the Restricted Local Area Network environment and an external transceiver communicatively connected to the at least one location.

7. A method for providing communication devices with temporary Internet access from a Restricted Local Area Network environment which is operational in a predetermined volumetric region of space, comprising:
 establishing bidirectional communications links via at least one portal with a plurality of communication devices extant in a Restricted Local Area Network environment, wherein the Restricted Local Area Network environment is operational in the predetermined volumetric region of space, and wherein the at least one portal provides the only communication services to the plurality of communication devices in the predetermined volumetric region of space;
 enabling, in the Restricted Local Area Network environment, at least one of the plurality of communication devices to download a prerequisite application by establishing a temporary bidirectional communication link with at least one location that is external to the predetermined volumetric region of space for the purpose of downloading a prerequisite application, comprising:
  authenticating, in response to a request from the at least one of the plurality of communication devices to establish the temporary bidirectional communication link with the at least one location that is external to the predetermined volumetric region of space, an identity of the at least one of the plurality of communication devices,
  authorizing the at least one of the plurality of communication devices to communicate with the at least one location via the temporary bidirectional communication link,
  enabling the at least one of the plurality of communication devices to establish the temporary bidirectional communication link with the at least one location as a function of at least one usage limitation selected from a class of usage limitations, including: total data bandwidth used, instantaneous bandwidth used, time duration of the temporary bidirectional communication link, and access of sites beyond a list of authorized sites, and
  terminating, in response to the at least one of the plurality of communication devices completing the download of the prerequisite application, the temporary bidirectional communication link with the at least one location that is external to the predetermined volumetric region of space after the download of the prerequisite application is completed;
 exchanging content data from a content manager with the at least one of the plurality of communication devices via the Restricted Local Area Network environment, the content manager having a content memory for storing the content data, and the content manager connected to the Restricted Local Area Network environment; and
 enabling the at least one of the plurality of communication devices to access the content manager in response to a request from the prerequisite application on the at least one of the plurality of communication devices.

8. The method for providing communication devices with temporary Internet access from a Restricted Local Area Network environment of claim 7 wherein the at least one portal establishes a wireless bidirectional communications link with the at least one of the plurality of communication devices via a radio transceiver.

9. The method for providing communication devices with temporary Internet access from a Restricted Local Area Network environment of claim 7 wherein the step of enabling further comprises:
 operating a radio frequency link that extends from the Restricted Local Area Network environment to a transceiver external to the predetermined volumetric region of space for bidirectional exchange of data communications between the at least one of the plurality of communication devices and the at least one location, wherein the at least one location is communicatively connected to the transceiver.

10. The method for providing communication devices with temporary Internet access from a Restricted Local Area Network environment of claim 7 wherein the step of enabling further comprises:
 operating a satellite link that extends from the Restricted Local Area Network environment to a transceiver external to the predetermined volumetric region of space for bidirectional exchange of data communications between the at least one of the plurality of communication devices and the at least one location, wherein the at least one location is communicatively connected to the transceiver.

* * * * *